United States Patent [19]

Jenkins et al.

[11] Patent Number: 4,957,570
[45] Date of Patent: Sep. 18, 1990

[54] BUTT-WELDING OF PIPES

[75] Inventors: Patrick W. Jenkins, Dronfield; Edwin A. W. Dunkey, Dronfield Woodhouse; Roy Cartwright, Dronfield, all of England

[73] Assignee: Fusion Group PLC, Dronfield, England

[21] Appl. No.: 361,959

[22] Filed: Jun. 6, 1989

Related U.S. Application Data

[62] Division of Ser. No. 59,059, Jun. 8, 1987, abandoned.

[30] Foreign Application Priority Data

Jun. 25, 1986 [GB] United Kingdom ............... 8615517

[51] Int. Cl.$^5$ ............................................. B29C 65/20
[52] U.S. Cl. ..................................... 156/64; 156/158; 156/267; 156/304.2; 156/304.5; 156/304.6; 156/309.6; 156/309.9; 156/358; 156/378; 156/499; 156/507
[58] Field of Search ................ 156/64, 157, 158, 267, 156/304.1, 304.2, 304.5, 304.6, 309.6, 309.9, 358, 360, 378, 499, 503, 507

[56] References Cited

U.S. PATENT DOCUMENTS

| | | | |
|---|---|---|---|
| 3,729,360 | 4/1973 | McElroy | 156/258 |
| 4,263,084 | 4/1981 | Takala | 156/158 |
| 4,640,732 | 2/1987 | Stafford | 156/358 |
| 4,684,430 | 8/1987 | Handa et al. | 156/378 |

FOREIGN PATENT DOCUMENTS

| | | | |
|---|---|---|---|
| 90-38023 | 3/1984 | Japan | 156/358 |
| 90-38024 | 3/1984 | Japan | 156/358 |

*Primary Examiner*—Michael Wityshyn
*Attorney, Agent, or Firm*—R. A. Giangiorgi

[57] ABSTRACT

The invention relates to the butt-welding of pipes of plastics materials. Equipment is alreaady known where pipe ends are first urged against a trimmer plate, and then urged against a heater plate to create beads of a required size at the ends of the pipes, following which the pipe ends are urged into abutting relationship for welding to occur. Particularly with automatic machines employing hydraulic power, the force applied between the pipe ends and the heater plate and subsequently between the pipe ends needs to include an allowance for the drag factor inherent in the pipeline and compensate for any frictional effect in the mechanical and hydraulic moving components, and which is a difficult calculation.

The object of the invention is to overcome the difficulties mentioned above, which objective is met by means comprising two opposed clamping means in each of which is to be secured one end of a plastics pipe with the end of the pipe protruding beyond the respective clamp by a predetermined degree, said clamping means being movable towards and away from each other by the action of a suitable motive power, and there being linear movement sensing means to sense the degree of movement of the clamps and/or of pipes secured to the clamps towards each other, said sensing means having an output signal to arrest the application of motive power to the clamps when a predetermined degree of linear movement of the clamps and pipes towards each other has been completed.

4 Claims, 1 Drawing Sheet

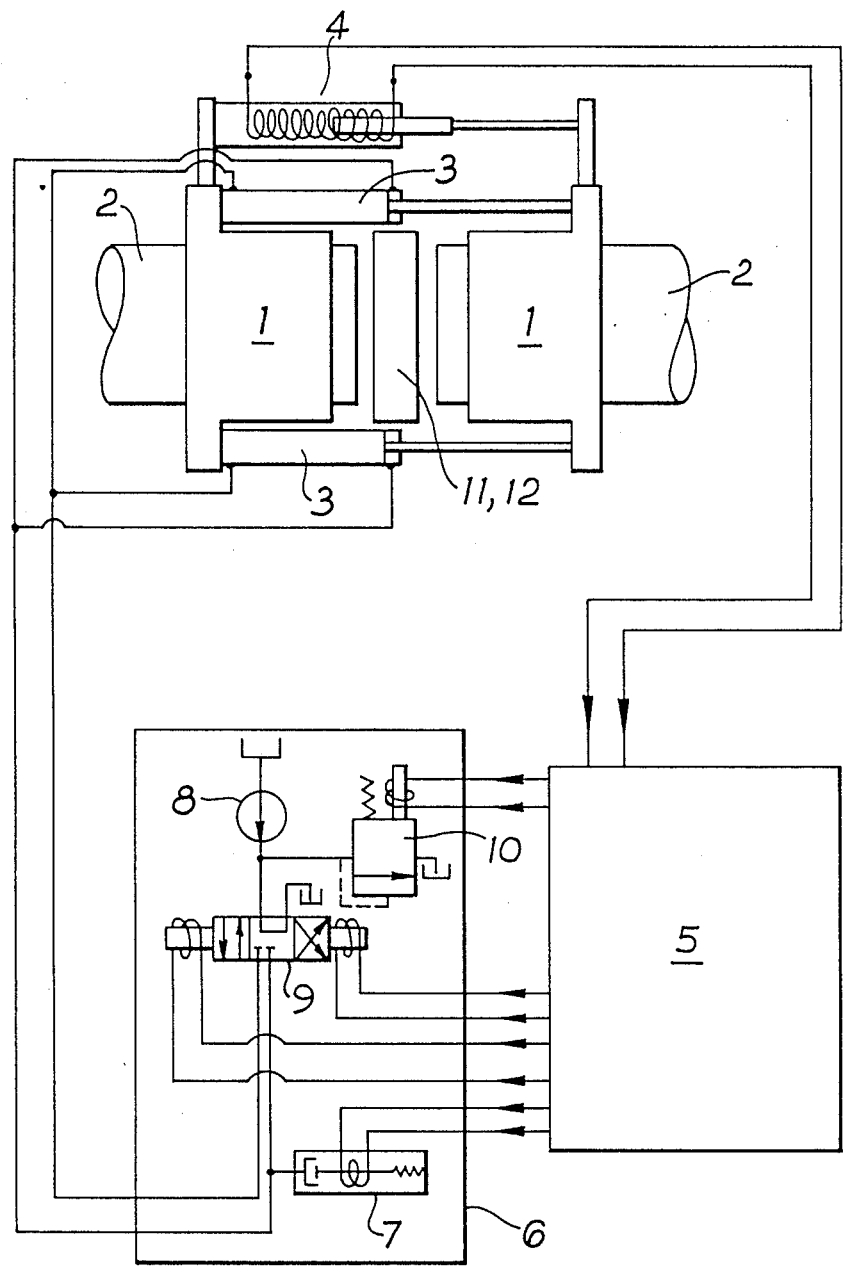

BUTT-WELDING OF PIPES

This is a divisional of co-pending application Ser. No. 059,059 filed on June 8, 1987, now abandoned.

This invention relates to the butt-welding of pipes of plastics materials.

There are numerous applications where successive lengths of plastics pipes in a pipeline must be in sealed engaging relationship, for the safe transport of fluids. This is particularly so with pipelines intended for the transport of gas.

As an alternative to the provision of a separate jointing member, it is already known to weld together adjacent ends of lengths of plastics pipes, by a butt-welding technique, and machines are already in existence to provide for both the manual and the automatic butt-welding of pipes.

The sequence of steps with both manual and automatic machines is essentially the same in that the plastics pipes are first located in appropriate clamps with the pipe ends protruding beyond the clamps to a predetermined degree and the clamps then urged towards each other to bring the pipe ends against opposite faces of a rotating trimmer plates as a means of removing any damaged part of the pipe end and to ensure that the pipe ends are square and parallel to each other. After retraction of the clamps and thus the pipe ends, the trimmer plate is removed and the trimmed pipe ends visually inspected and then brought into abutting relationship to ensure that the pipe ends correctly contact each other around their entire periphery. The clamps are then retracted and a heater located between the pipe ends and the clamps again urged towards each other to bring the pipe ends into contact with opposite sides of the heater plate at a pressure sufficient to deform the pipe ends to produce beads around their periphery, of a predetermined, acceptable size and for a time at reduced pressure to ensure that the pipe ends are heated to an appropriate degree. Following that the clamps are againg retracted and the heater plate removed, and the clamps again urged towards each other to bring the pipe ends into abutting relationship and at a pressure such that there is a required penetration of the pipe ends into each other, and for a period of time such that effective welding together of the pipe ends can be guaranteed.

At each of the three stages, the pressure of the pipe ends against first the trimmer plate, then the heater plate, and finally against each other, is an important factor. At the final welding stage, it is customary for a plastics pipe manufacturer to provide data dictated by the nature of the plastics material, the diameter of the pipe, and its wall thickness, confirming the pressure at which pipe ends must be held in abutting relationship for welding to be effective. With manual machines and automatic machines that are hydraulically powered, an allowance must be made for the drag factor inherent in the pipeline, and possibly to compensate for any frictional effect in the mechanical and hydraulic moving components of the machine. Calculating the drag factor and allowing for frictional effect is particularly difficult, and whilst various guidelines are provided to an operative in connection with a particular machine as to the degree that the pipe manufacturer's recommended welding pressure is to be modified, much is left to the skill of the operative in ensuring that a manual machine is operated correctly and that a pressure relief valve in the hydraulic circuit of an automatic machine is set correctly to bring about an effective and acceptable weld between the pipe ends.

A similar consideration applies at the stage that the pipe ends are brought against a heater plate. The pressure at which the pipe ends abut the heater plate will affect the size of a bead formed around the periphery of the pipe ends, which bead forms an important part in the subsequent welding stage and usually must be within size limitations imposed by the ultimate user of the pipeline. Here again, whilst the pipe manufacturer can provide advice as to the pressure at which the pipe end must be brought against a heater plate to generate a bead of a particular size, that recommended pressure must be modified to take into account the drag factor of the machine, whether manual or automatic, with the inherent difficulties here as have been mentioned above. Again with a manual machine much is left to the skill of the operative, and with an automatic machine correct bead formation has been attempted to be resolved by setting a pressure relief valve in the hydraulic circuit at the pressure that will subsequently be required for the welding stage and then imposing a time control to set the duration that the pipe ends are held against the heater plate at that pressure whereby to produce a bead of the required size.

The object of the present invention is to provide an improved butt-welding means that avoids the disadvantages mentioned above.

According to the present invention, butt-welding means comprises two opposed clamping means in each of which is to be secured one end of a plastics pipe with the end of the pipe protruding beyond the respective clamp by a predetermined degree, said clamping means being movable towards and away from each other by the action of a suitable motive power, and there being linear movement sensing means to sense the degree of movement of the clamps and/or of pipes secured to the clamps towards each other, said sensing means having an output signal to arrest the application of motive power to the clamps when a predetermined degree of linear movement of the clamps and pipes towards each other has been completed.

Preferably, the motive power for driving the clamps towards and away from each other is hydraulic power, and it is futher preferred that in addition to the linear movement sensing means a pressure relief valve is provide in the hydraulic circuit, together with pressure sensing means in the hydraulic line to the clamps.

Thus, at the onset of operations pipes are secured in the clamps with the pipe ends protruding beyond the clamps and a rotatable trimming plate located between the spaced pipe ends. Hydraulic power is then activated to drive the clamps towards each other to bring the pipe ends into contact with opposite faces of the trimmer plate, to effect trimming of the pipe ends until the pipe ends protrude beyond the clamps to a predetermined degree. When provided, it is desirable to set the pressure relief valve from the hydraulic circuit at a level such that the pipe ends cannot be urged against the trimmer plate at an excessive, unacceptable pressure. Following trimming, the pipe clamps are retracted to allow a visual inspection of the trimmed pipe ends, and if trimming has been successfully completed, the trimmer plate is removed and the clamps urged towards each other again to bring the pipe ends into abutting relationship to check that there is good contact between the pipe ends around their entire periphery. The degree of movement of the pipe ends from their initial position and into contact with each other is sensed by the linear movement sensing means to establish a datum check for the subsequent heating stage.

The clamps, and hence pipes, are then retracted, and a heater plate positioned between the spaced pipe ends. The pressure relief valve is then gradually closed until clamp movement occurs at a predetermined velocity, and at which point a signal from the pressure sensing means is passed to a microprocessor which has been preprogrammed with the welding pressure for the particular pipes recommended by the pipe manufacturer. The microprocessor then signals the pressure relief valve to set it at the aggregate of the two pressures, and the clamps are driven towards each other to bring the pipe ends into contact with the heater plate. Following contact between the pipe ends and the heater plate, movement of the clamps and hence the pipes is allowed to continue to a predetermined degree to drive the pipe ends against the heater plate and hence generate a bead around the periphery of the pipe ends of required size. Once the linear movement sensing means has sensed that that additional degree of movement has been completed, the drive means for hydraulic fluid is rendered inactive to suspend further movement of the pipe ends and to hold the pipe ends against the heater plate for a period of time to allow adequate soaking of the pipe ends to take place.

Following this the clamps, and thus pipes, are again retracted, the heater plate removed, and the clamps and hence pipes driven towards each other again with the pressure relief valve set at its maximum, until such time as the pipe ends are brought into abutting relationship. When the linear sensing means have sensed that that degree of movement has been completed, movement of the clamps and hence the pipes is allowed to continue to a predetermined degree to permit adequate penetration of the pipe end into each other, at which point a signal from the linear movement sensing means activates the pressure sensing means to read the pressure in the hydraulic circuit and set the relief valve at that pressure, and the pipe ends are held against each other at the correct welding pressure for a period of time to permit effective welding to take place.

As an alternative to the above, and particularly at the welding stage, the clamps and pipes can be urged towards each other with the pressure relief valve set at its maximum. After movement to bring the pipe ends into very close proximity has been sensed, the pressure relief valve is signalled to set it to the level of the summation of the manufacturers recommended welding pressure and the pressure previously sensed at the movement of the clamps at a predetermined velocity, stored in the data storage means, and whereby the pipe ends are brought into contact at the correct welding pressure with an effective compensation for the drag factor effect in the mechanical and hydraulic moving components of the equipment. After the pipes have penetrated each other to a degree determined by the setting of the pressure relief valve, the pipe ends held against each other for a time sufficient to permit effective welding to take place. Here linear control can be employed to ensure that the degree of penetration is between defined limits.

As a still further possible alternative to the above at the welding stage, a velocity control valve can be provided in the hydraulic circuit. Thus, when the linear movement sensing means have sensed that the degree of movement to bring the pipe ends into contact an activating signal is sent to the velocity control valve to reduce supply of hydraulic fluid and bring the pipe clamps and hence pipes to rest after they have been allowed to travel to a predetermined degree for correct penetration. At this point a signal from the linear movement sensing means activates the pressure relief valve in the hydraulic circuit to set it at the summation of the pressure simulating the drag factor and the manufacturers recommended welding pressure, and when the pipe ends are held against each other at the correct welding pressure and for a period of time to permit effective welding to take place.

BRIEF DESCRIPTION OF THE DRAWING

The FIGURE shows a schematic representation of a butt welding machine according to the invention.

DETAILED DESCRIPTION OF THE INVENTION

One embodiment of the invention will now be described by way of example only with reference to the accompanying schematic representation of a butt welding machine according to the invention.

In the drawing, two clamps 1 are provided in each of which is located the end of a pipe 2. Hydraulic cylinder and ram means 3 (two shown) are provided to allow the clamps to be urged towards and away from each other.

Mounted between the clamps is a linear transducer 4, the output from which can be fed to the memory of a micropocessor 5, and in the hydraulic line from a hydraulic power unit 6 to the annulus side of the cylinder and rams 3 is a pressure transducer 7, the signals from which are also fed to the microprocessor.

In the hydraulic line from a pump 8 to the cylinder and ram units 3 is a direcitonal valve 9 under the control of the microprocessor unit and between the pump and the directional valve is a pressure relief valve 10 also under the control of the microprocessor.

Thus, at the onset of operations, the pressure relief valve is closed to a degree to allow the clamps 1 and pipe ends 2 to be urged against a trimmer plate 11 interposed between the clamps, at a pressure that prevents the pipe ends from contacting the trimmer plate with unnecessary force. The clamps are then retracted, the trimmer plate removed, and after a visual inspection, the pipe ends brought against each other to ensure that they are in contact around their full periphery. The degree of movement of the clamps from their position of rest to their position when the pipe ends are in contact is detected, and that information fed to the microprocessor, and which has been pre-programmed with a predetermined additional degree of required movement as will be explained below.

The clamps and pipe ends are then withdrawn, and a heater plate 12 is introduced between the clamps. At this point, the relief valve 10 is open and is slowly closed until the clamps move at a predetermined velocity, and when the signal from the pressure sensing means is fed to the microprocessor, and which has been preprogrammed with a particular pipe manufactures recommended welding pressure. The pressure at the predetermined velocity is then added to the particular pipe manufactures recommended welding pressure and the relief valve 10 set at that aggregate value, to prevent the pipe ends from being applied to the heater plate with excessive force. Once the pipe ends are in contact with the heater plate, and the transducer signals that the clamps have moved to the same degree as has previously been determined, the pipe clamps are permitted to move the further distance preprogrammed in the microprocessor, to allow the creation of a bead of required size on the pipe ends, and on completion of that further required movement, movement of the clamps is arrested, and the pipe ends held against the heater plate for an appropriate soaking period.

The clamps are then retracted, the heater plate removed and the clamps moved towards each other with the relief valve set at its maximum value under the control of the microprocessor. When the transducer signals that the clamps have moved a distance to bring the pipe ends into contact, movement of the clamps and hence the pipes is allowed to continue to a degree preprogrammed in the microprocessor, to permit adequate penetration of the pipe ends into each other, and on completion of that further movement the pressure sensor senses the pressure in the line at that time and causes the setting of the relief valve to the sensed pressure to maintain the pipe ends in contact for a period of time to allow correct butt-welding to take place.

As a possible alternative, the pipe ends can be brought into very close proximity with the pressure relief valve set at its maximum, the transducer signals the microprocessor that the clamps have completed that movement and when the microprocessor activates the pressure relief valve to set it at the aggregate of the manufacturers recommended welding pressure and the pressure sensed in the hydraulic line with the clamps movimg at a predetermined velocity. The degree of penetration of the pipe ends is determined by the line pressure and the setting of the pressure relief valve, and the pipe ends held together for a time sufficient to ensure that correct welding has taken place. Here the transducer can be used to sense the degree of penetration of the pipes to ensure that it is within predetermined limits.

We claim:

1. A method for the butt-welding of pipes comprising locating the ends of pipes in respective clamps which clamps are movable towards and away from each other under hydraulic power, effecting trimming of the pipe ends against a trimmer plate in conventional manner urging the trimmed pipe ends into contact to check that the trimmed pipe ends are in contact around their full periphery, sensing the distance moved by the clamps from their position of rest to their position where the pipe ends are in contact storing the information on distance moved in microprocessor control means having been preprogrammed with an additional required clamp movement, withdrawing the clamps, inserting a heater plate between the pipe ends, moving the clamps towards each other to bring the pipe ends into contact with the heater plate and until the clamps have moved said stored distance moved plus said preprogrammed additional required clamp movement and whereby a bead of a correct required size is formed on the ends of the pipes.

2. A method of butt-welding as in claim 1, wherein at a welding stage the clamps are caused to move by said stored distance to bring the pipe ends into contact and by a further distance preprogrammed into the microprocessor control means to bring about correct penetration of the pipe ends, and when said clamp movement through said preprogrammed further distance has been completed, line pressure of said hydraulic power is sensed and a relief valve is immediately set at the sensed line pressure, and the pipe ends held against each other for a period of time sufficient to allow butt-welding to be completed.

3. A method of butt-welding as in claim 1 wherein at the commencement of movement of the clamps towards the heater plate and when the clamps are moving at a predetermined velocity, the pressure in the hydraulic line is sensed and an appropriate signal sent to the microprocessor control means having been preprogrammed with a pressure recommended for a welding stage of said pipes, the microprocessor means immediately signalling a relief valve in the hydraulic line to set the relief valve at the summation of the sensed pressure and said recommended pressure and whereby the pipe ends are applied against the heater plate with an acceptable degree of force.

4. A method of butt-welding as in claim 3, wherein at a welding stage the clamps are caused to move a predetermined distance less than said stored distance moved and to bring the pipe ends into contact, at which point said pressure relief valve is set by the microprocessor control means at the summation of said sensed pressure and said recommended pressure to bring the pipe ends into contact at the correct welding pressure, and when the contacted pipe ends penetrate each other by a self-determining degree, the degree of liner movement of penetration is sensed and checked against a predetermined required degree of penetration preprogrammed in the microprocessor control means.

* * * * *